Figure 2:
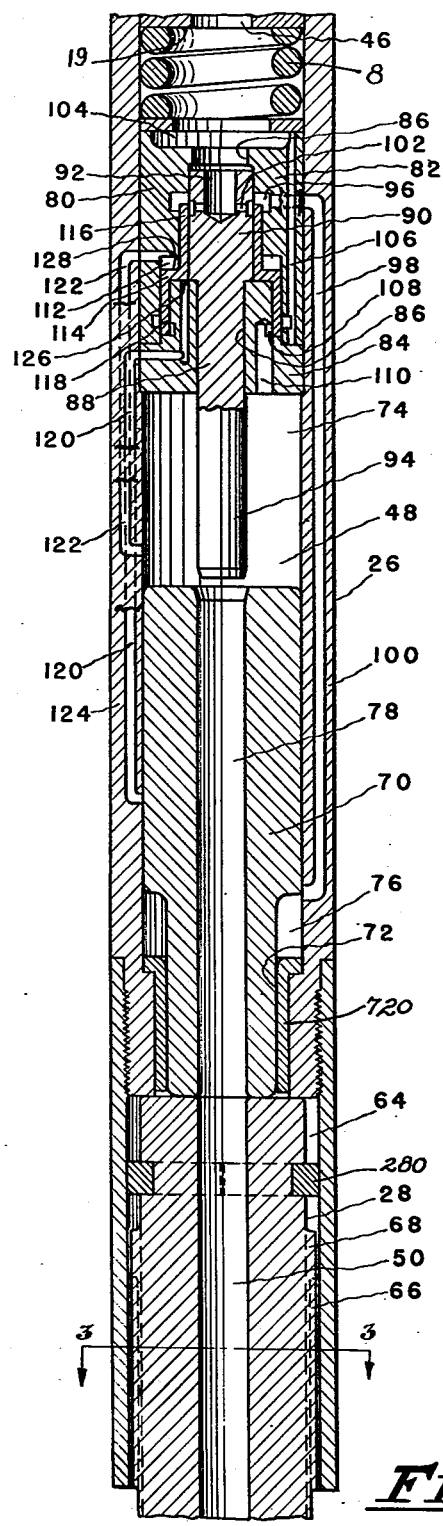

Oct. 22, 1957  W. A. MORRISON  2,810,549
FLUID ACTUATED PERCUSSIVE TOOL
Filed Jan. 16, 1953  2 Sheets-Sheet 1

INVENTOR
WILLIAM A. MORRISON
BY
HIS ATTORNEY

Oct. 22, 1957   W. A. MORRISON   2,810,549
FLUID ACTUATED PERCUSSIVE TOOL
Filed Jan. 16, 1953   2 Sheets-Sheet 2
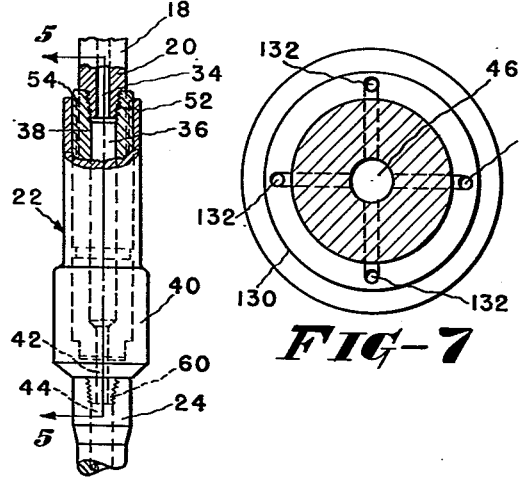
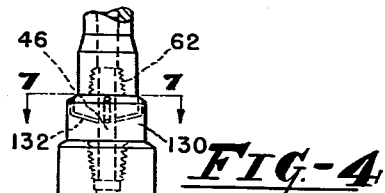
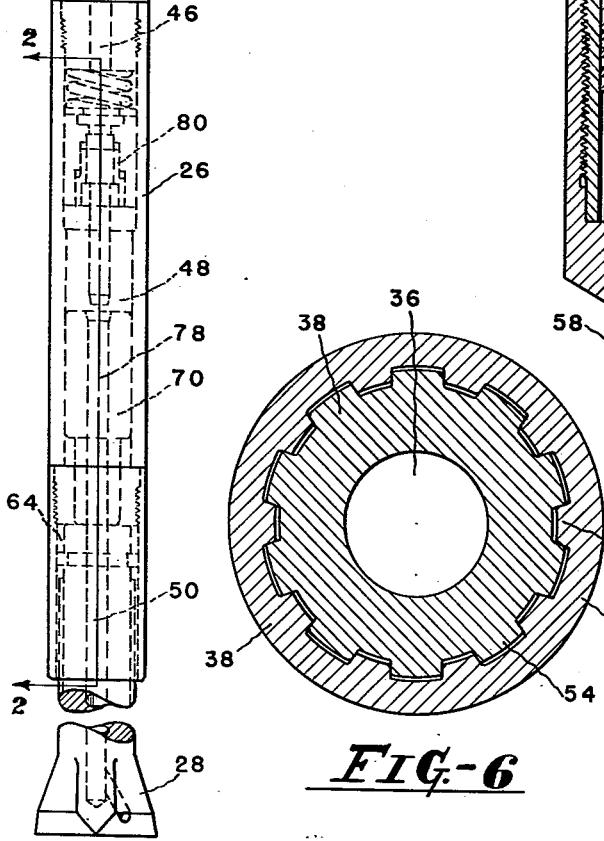
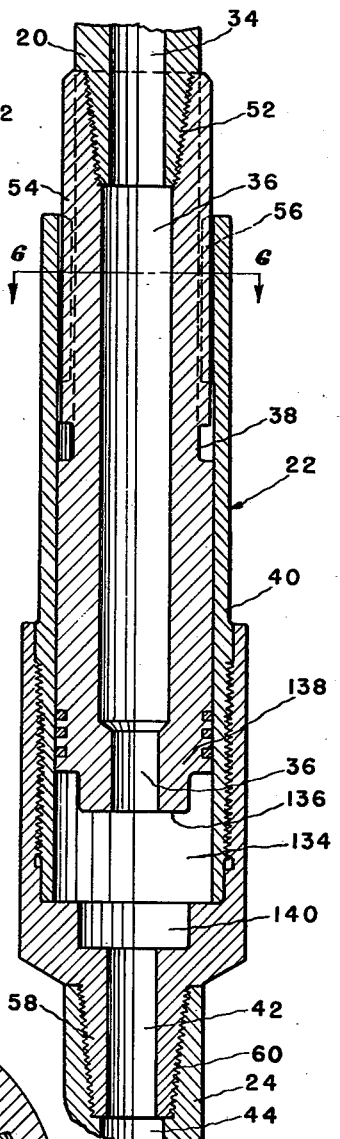
INVENTOR
WILLIAM A. MORRISON
HIS ATTORNEY United States Patent Office 2,810,549
Patented Oct. 22, 1957

2,810,549

FLUID ACTUATED PERCUSSIVE TOOL

William A. Morrison, Easton, Pa., assignor to Ingersoll-Rand Company, New York, N. Y., a corporation of New Jersey Application January 16, 1953, Serial No. 331,561

5 Claims. (Cl. 255—4.4)

The invention relates to percussive rock drills, and more particularly to rock drills of the "down-hole" type wherein the rock drill is inserted into the drilled hole.

Such drills are commonly used to drill holes of very large diameter. Where the ground is soft a rotary non-percussive type of drill, such as those utilizing the tri-cone roller type of bit, is used. However, when hard rock formations are encountered it is necessary to use a drill of the percussive type.

It is, accordingly, one object of the applicant's invention to provide a percussive rock drill which may be readily adapted for use with a rotary drilling apparatus.

The principal advantage achieved by inserting the drill into the drilled hole is that the hammer blow does not have to travel through a great many drill stem sections with the corresponding loss in energy. By placing the drill at the bottom of the hole, however, proper support cannot be given to the drill and the reaction caused by the reciprocation of the piston in the piston chamber sets the entire drilling apparatus to vibrating violently.

The second object of the applicant's invention, therefore, is to provide a rock drill of the "down-hole" type with a simple and inexpensive means for absorbing the reaction resulting from the operation of the piston in the piston chamber.

Because of the scarcity of water in certain areas and because of many other difficulties which arise with wet drilling it is far preferable in drilling holes of large diameter to use air under pressure in removing the rock chips from the drilled hole. However, the problem of getting enough pressure fluid to the bottom of the hole and of maintaining a sufficient flow of fluid to carry the rock chips from the hole becomes acute.

Accordingly, another object of the applicant's invention is to provide a rock drill of the "down-hole" type which will supply an adequate amount of cleansing fluid at the bottom of the drilled hole.

A further object of the applicant's invention is to provide additional means on the rock drill which will ensure a sufficient flow of fluid upwardly through the drilled hole to carry the rock chips to the surface.

Further objects of the applicant's invention will be in part obvious and in part pointed out hereinafter.

Briefly, the device by which the applicant achieves the above mentioned objectives comprises, in the main, four principal parts; a drill casing insertable within the drill hole, a cushioning member, drill stem sections connecting the drill casing and the cushioning member, and a source of power for rotating the entire assembly.

The drill stem sections are of a well known type having passageways passing throughout the central portions so as to form a conduit for conveying pressure fluid to the drill casing. The cushioning member comprises a stationary piston-type element fixedly connected to the spindle of the rotary motor and a cylinder-like member slidable with respect to the first mentioned element and cooperating therewith to form a cushioning chamber. Both the cylinder member and the piston element are provided with passageways coaxial with the passageways in the adjacent drill stem sections so that the pressure fluid may pass through the cushioning member to the drill stem sections. Because the chamber formed within the cushioning member has a greater area than the passageways for the pressure fluid any relative movement of the cylinder with respect to the piston results in a cushioning effect. In order to obtain further cushioning, the piston member is provided with a centrally located extension designed to fit snugly into a corresponding recess in the cushioning chamber defined by the slidable cylinder member. When the extension invades the area of the recess communication is cut-off between an annular cushioning chamber and the pressure fluid passageways but the flow of pressure fluid through the passageways in the cushioning member and the drill stem sections is not impeded. In this manner adiabatic compression in the annular cushioning chamber is obtained without interrupting the flow of pressure fluid through the tool.

The drill casing is coupled to the drill stem sections at the bottom of the drilled hole and in general defines a cylindrical piston chamber having a reciprocatory piston residing therein. The casing also contains suitable valve means for alternately charging the terminal portions of the piston chamber with pressure fluid. At the lower end of the piston chamber there is an opening which communicates with the bottom of the hole through a central passageway in the drilling tool. Coaxial with the passageway in the drilling tool is a similar passageway in the piston. The casing also defines additional valve means which, when operated by the piston, exhausts the expanded pressure fluid from both ends of the piston chamber through the passageways in the piston and the drilling tool to the bottom of the hole.

At the back head portion of the drill casing there is located a plurality of passages which communicate the central pressure fluid supply conduit with the peripheral portions of the drilled hole thereby exhausting unexpanded pressure fluid to the drilled hole where the annular flow area past the drill increases due to a decrease in diameter of the drill. This fluid cooperates with that delivered to the bottom of the hole to convey rock chips to the surface of the hole.

Figure 1:
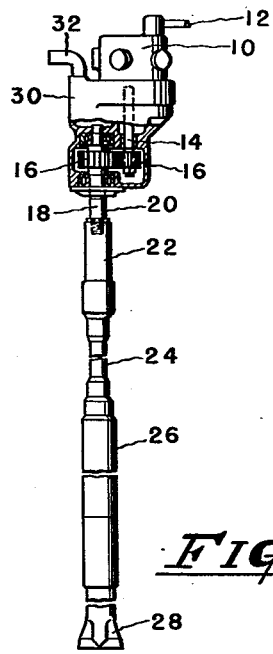
Figure 3:
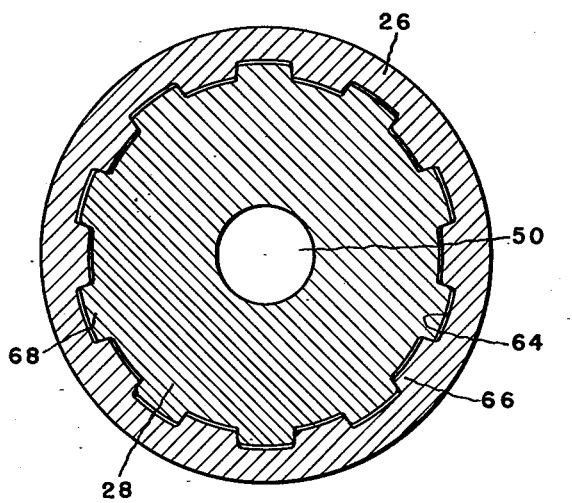

In the drawings accompanying this specification and in which similar reference numerals apply to similar parts, Fig. 1 is an external view of the invention, partly in section, showing the relation of the component parts, Fig. 2 is a longitudinal section of the drill casing taken along the line 2—2 in Fig. 4 looking in the direction of the arrows showing the percussive mechanism of the tool and the cleansing arrangement for delivering pressure fluid to the bottom of the hole, Fig. 3 is a transverse section through Fig. 2 taken along the line 3—3 looking in the direction of the arrows showing the interlocking relation of the drill casing to the drilling tool whereby rotation of the former is translated to the latter, Fig. 4 is an external view of that portion of the invention which is rotated by the rotary motor, Fig. 5 is a longitudinal section of the cushioning member taken along the line 5—5 in Fig. 4, Fig. 6 is a transverse section through Fig. 5 taken along the line 6—6 looking in the direction of the arrows showing the interlocking engagement between the slidable and nonslidable sections of the cushioning member whereby rotation of the drilling apparatus is effected, and Fig. 7 is a transverse section through Fig. 4 taken along the line 7—7 looking in the direction of the arrows and showing the means on the back head of the drill casing for maintaining a sufficient upward flow of fluid in the hole.

Referring now to the drawings for a detailed description of a preferred embodiment of the applicant's invention, and particularly to Fig. 1, there is shown a rotary motor 10 which is actuated by a supply of pressure fluid delivered through the conduit 12 from a suitable source (not shown). The power developed by this motor is transmitted through the shaft 14 and a pair of rotary gears 16 to a spindle 18. At its free end 20 the spindle 18 is threadingly connected to a cushioning device 22 for absorbing the reaction resulting from the operation of the drill. The cushioning member 22 in turn is threadingly connected to a series of drill stem sections 24 which are connected to a drill casing 26 designed to be inserted within the drilled hole. A drilling tool or bit 28 is slidably inserted into the drill casing 26 and when actuated by the drill transmits the percussive blows of the drill to the rock causing it to fracture. The motor casing 30 is provided with an additional conduit 32 for conveying pressure fluid from a suitable source (not shown) to the spindle 18 and thence through the cushioning member 22 and drill stem sections 24 to the drill casing. The drill bit is held in the casing by a conventional split ring 280.

The path of the pressure fluid being supplied to the drill casing 26 may be traced by referring to Fig. 4. The spindle 18 is provided with a centrally located bore 34 coaxial with a similar bore or passageway 36 in the stationary member 38 of the cushioning means 22. In like manner, the slidable member 40 of the cushioning means 22 is also provided with a central passageway 42 coaxial with the central passageways 44 formed in the drill stem sections 24. The passageways 44 in the drill stem sections 24 deliver the supply fluid to a corresponding passageway 46 formed in the drill casing 26 where suitable valve means 80 alternately charge the terminal portions of the piston chamber 48 in the drill casing 26. From the piston chamber 48 the expanded pressure fluid passes through a central bore or passageway 50 in the drilling tool 28 where it is delivered to the bottom of the drilled hole.

Rotation of the spindle 18 causes rotation of the stationary member 38 of the cushioning means 22 because the members are threadingly connected at 52. The stationary member 38 is provided with a series of splines 54 at one end which interlock with a series of corresponding splines 56 (Fig. 5) located upon the slidable casing member 40, the clearance between the splines being sufficient to allow slidable movement of the casing 40 with respect to the stationary member 38 (see Fig. 6). At its opposite end 58, the casing member 40 is threadedly connected at 60 to the drill stem sections 24 and the drill stem sections are in turn threadedly joined at 62 to the drill casing 26. Rotation of the casing 40 of the cushioning means 22, therefore, causes corresponding rotation of the drill stem sections 24 and of the drill casing 26. The drill casing 26 is provided with a recess 64 at its front end in order to receive the drilling tool 28 and the recess contains a series of splines 66 which interlockingly engage with a series of corresponding splines 68 on the outer periphery of the drilling tool 28 so that the rotation of the drill casing is translated to the drilling tool (Fig. 3).

Referring now to Fig. 2 for a detailed description of the percussive mechanism and the means for delivering pressure fluid to the bottom of the drilled hole, the drill casing 26 defines a cylindrical piston chamber 48 in which a piston hammer 70 is actuated, in response to the expansion of pressure fluid within the chamber, to strike the drilling tool 28 slidably inserted into the drill casing. Access is provided between the piston chamber 48 and the recess 64 which receives the drilling tool 28 by means of a passage 72 which is normally open when the piston 70 is at the rearward portion 74 of the chamber 48 but which is closed by the piston when it is in the front end portion 76 of the chamber 48. In furtherance to this, the forward end portion of the piston 70 slidably fits in the passage or bore 72 providing a closure on the piston for the bore. The bore is opened when the piston nose is withdrawn therefrom as the piston approaches the rearward end of its stroke. In the form of the invention shown, a replaceable liner 720 is mounted in the casing in which the piston nose slides when closing the bore 72. The piston 70 is provided with a passageway 78 coaxial with the passageway 50 in the drilling tool 28 so that rearward portion 74 of the piston chamber 48 is in communication with the bottom of the hole when the piston assumes its front end position. Thus the front end 76 of the piston chamber 48 is in communication with the bottom of the hole whenever the piston 70 is in its rearward position and the rearward portion 74 of the piston chamber is in communication with the bottom of the hole whenever the piston is in its front end position.

A suitable valve mechanism 80 is provided in the drill casing 26 to alternately charge the terminal portions of the piston chamber 48 with pressure fluid. The valve mechanism 80 is of the type forming the subject matter of U. S. Patent No. 2,051,616 to W. A. Morrison and to which patent access may be had for a full disclosure. It accordingly comprises a pair of members 82 and 84 having centrally located bores 86 for the accommodation of a cylindrical rod 88. At its rearward end 90 the rod 88 is provided with a recess 92 communicating with the passageway 46 and at its forward end 94 the rod 88 extends beyond the valve mechanism 80 into the piston chamber 48 where it serves as a closure for the passage 78 in the piston 70 and cooperates therewith to control the flow of pressure fluid from the rearward portion 74 of the piston chamber 48 to the bottom of the drilled hole. That is, the rod 88 closes the passage 78 except during the forward end portion of the piston stroke when the piston is displaced from the rod end 94 to open passage 78. Valve member 82 is provided with an annular chamber 96 which communicates with the front end 76 of the piston chamber 48 by means of a passageway 98 in the wall 100 of the drill casing 26 and which also communicates with the recess 92 in the rod 88 through the passageways 102 therein. Pressure fluid from the supply conduit 46 is thereby conveyed from the recess 92 through the passageways 102 to the chamber 96 thence through the passageway 98 to the front end 76 of the piston chamber 48. Valve member 82 is also provided with a recess 104 and a passageway 106 the communication of which with an annular chamber 108 in valve member 84 is controlled by the valve 114 as described hereinafter. Another passageway 110 in valve member 84 communicates the chamber 108 with the rearward portion 74 of the piston chamber 48. In this manner pressure fluid from the supply conduit 46 is conveyed by the passageway 106 to the chamber 108 and thence to the piston chamber 48 through the passageway 110.

The valve members 82 and 84 cooperate to define a chamber 112 for a slidable sleeve-like valve 114 designed to control the flow of pressure fluid to the piston chamber and are held against endwise movement by a spring 8 interposed between the member 82 and a shoulder 19 in the casing 26. The upper or rearward portion 116 of the valve 114 is interposed between the rod 88 and the valve member 82 and controls communication between the passageways 102 in the rod 88 and the annular chamber 96 in the valve member 82. The lower or front portion 118 of the valve 114 is interposed between valve members 82 and 84 and controls communication between passageway 106 in valve member 82 and passageway 110 in valve member 84.

Slidable valve 114 is actuated by pressure fluid conveyed from the piston chamber 48 by a pair of passageways 120, 122 in the wall 124 of the drill casing 26. When the piston 70 uncovers the passageway 120, pressure fluid from the front end 76 of the piston chamber 48 is valved to the lower valve surface 126 on the valve 114 and the valve is thrust to its upper limiting position. When the piston 70 uncovers the passageway 122, pressure fluid from the back portion 74 of the piston chamber 48 is valved to the opposite or upper valve surface 128 and the valve 114 is thrust to its lower limiting position.

At the point of operation shown in the drawing, the piston 70 is shown at the moment of impact with the drilling tool 28. The slidable valve 114 is in its lower position allowing communication between the recess 92 in the rod 88 and the chamber 96 in the valve member 82. The pressure fluid thus delivered to the front end 76 of the piston chamber 48 through the passageway 98 will cause the piston 70 to move upwardly toward the valve mechanism 80 and the rod 88 enters the central passageway 78 that extends throughout the length of the piston 70, thus preventing communication between the rearward portion 74 of the piston chamber 48 and the drilling tool 28. The air thus trapped in the chamber portion 74 is compressed by the piston 70 and it serves as an air spring to aid in halting the rearward movement of the piston before it strikes the member 84.

It is to be noted that in the piston position shown, the passage 122 is exhausted through the chamber portion 74 and passageway 78. This lowers the pressure of fluid acting on the valve surface 128 so that when the piston 70 uncovers the passageway 120, pressure fluid conveyed from the front end 76 of the piston chamber 48 to the underside 126 of the slidable valve 114 will move the valve to its upper position. In the upper position, the valve 114 cuts off the flow of pressure fluid to the front end 76 of the piston chamber 48 and allows pressure fluid to be valved through the passageway 110 to the rearward portion 74 of the piston chamber 48. The pressure fluid at the front end 76 of the piston chamber 48 and passageway 120 is now exhausted through the drilling tool 28 to the bottom of the hole because the piston 70 has entirely withdrawn from the opening 72 between the piston chamber 48 and the recess 64 for the drilling tool 28.

When sufficient pressure fluid has been delivered to the rearward portion 74 of the piston chamber 48, the piston 70 is moved in a downward direction on its power stroke. As the piston travels downwardly, it uncovers the passageway 122 in the drill casing 26 and valves pressure fluid to the upper side 128 of the sliding valve 114 which causes the valve to move to its downward position. Pressure fluid is then conveyed through the passageway 98 to the front end 76 of the piston chamber 48. As the piston 70 moves downwardly below the rod 88 the rearward portion 74 of the piston chamber 48 is communicated with the bottom of the drilled hole through the passageway 78 in the piston 70 and the passageway 50, in the drilling tool 28 and the fluid will then escape from the chamber 74 through these passages into the drill hole and blow the cuttings therefrom. In this manner the expanded pressure fluid in the piston chamber 48 is alternately exhausted from both terminal portions of the chamber through the passageway 50 in the drilling tool 28 to the bottom of the drilled hole.

The diameter of the drill casing 26 is only slightly less than the diameter of the drilled hole and as a consequence, the annular area surrounding the drill casing is very small. Because of this small annular area, the flow of expanded fluid from the bottom of the hole upwardly past the casing is very great and more than sufficient to carry the rock chips away from the bottom of the hole. However, due to the fact that the drill stem sections 24 have a much smaller diameter than that of the drill casing 26, the annular area of the hole increases at a point adjacent the back head portion 130 of the drill casing 26. As a consequence, the flow of pressure fluid suddenly decreases and no longer is able to convey the rock chips upwardly through the hole. To overcome this problem the applicant has, on the back head portion 130 of the drill casing 26, provided a plurality of passages 132 in communication with the central supply fluid conduit 46 so as to exhaust unexpended pressure fluid from the supply conduit to the peripheral portions of the drilled hole at a point adjacent the increased annular area. The additional pressure fluid thus introduced into the hole cooperates with the expanded pressure fluid from the bottom of the hole to convey the rock chips upwardly and outwardly from the hole.

The cushioning means 22 (Fig. 5) comprises a stationary piston-like member 38 and a slidable cylindrical casing member 40 which, in cooperation with the first mentioned member 38, forms a cushioning chamber 134. That is, air pressure in the chamber 134 acting on the surface of the member 40 defining the lower end of chamber 134 tends constantly to urge the drill toward the work and yet because there is no positive connection against longitudinal movement, the drill vibrations are not transmitted directly to the spindle 18.

To avoid any possibility of the piston 38 positively engaging the member 40 against longitudinal movement rearwardly in the event of excessive vibrations of the drill, a cylindrical extension 136 is provided on the central portion 138 of the piston 38 which is designed to fit within a corresponding cylindrical recess 140 in the slidable casing member 40 in order to prevent communication between the cushioning chamber 134 and the central supply fluid conduit 46 whenever the casing member 40 moves a sufficiently great distance toward the stationary piston member 38. The air trapped in the chamber 134 when the extension 136 enters the recess 140 serves as an air spring to prevent positive engagement of the member 40 with the piston against longitudinal movement. Because the passageways 36, 42 for the supply fluid are located along the central axis of the cushioning means 22 the insertion of the extension 136 into the recess 140 does not interfere with the flow of pressure fluid to the drill casing.

It will be obvious to those skilled in the art upon a reading of the applicant's disclosure that many modifications of the preferred embodiment might be made without departing from the scope of the invention. Accordingly, the invention is not limited to the single form disclosed in the specification and the drawings but only by the scope of the appended claims.

I claim:

1. In a fluid actuated rock drill, the combination of a casing and a drilling tool extending slidably into the casing and having a passageway for the passage of cleansing fluid therethrough, a piston chamber in the casing having an opening at its forward end, a reciprocatory piston in the piston chamber for actuating the drilling tool and having a surface on the forward end portion thereof exposed to pressure fluid in the forward end of the piston chamber, means for effecting the alternate charging of the ends of the piston chamber with pressure fluid to actuate the piston, and means at the ends of the piston chamber and at the terminal portions of the piston cooperating with each other for valving alternately pressure fluid from the front and rear ends of the piston chamber to the passageway.

2. In a fluid actuated rock drill, the combination of a casing and a drilling tool extending slidably into the casing and having a passageway for the passage of cleansing fluid therethrough, a piston chamber in the casing, a bore in the casing to afford communication between the forward end of the piston chamber and the passageway, a reciprocatory piston in the piston chamber for actuating the drilling tool and having a passage to afford communication between the rearward end of the piston chamber and the passageway, means for effecting the alternate charging of the ends of the piston chamber with pressure fluid to actuate the piston, a closure in the casing for the passage serving to open said passage near the end of the forward stroke of the piston to permit the exhaust of fluid from the rearward end of the piston chamber through the passage to the passageway, and a closure on the piston for the bore acting to open said bore near the end of the rearward stroke of the piston to permit the exhaust of fluid from the front end of the piston chamber through the bore to the passageway.

3. An apparatus for drilling holes in rock formations, comprising a plurality of sections connected in end to end relation for rotary movement, a casing connected to an end section of said sections and having a piston chamber therein, said sections and casing being insertable within the hole being drilled, a drilling tool slidably inserted into the casing and engaged for rotary movement therewith, a reciprocal piston in the chamber for striking the tool and having a surface defining the rearward end of the chamber portion forward of said piston, one of said sections including a cushioning means for cushioning the reaction resulting from the operation of the piston, conduit means in said sections for conveying a supply of pressure fluid to the casing, means for alternately charging the ends of the chamber with such fluid to actuate the piston, and means for rotating the aforementioned sections and casing within the hole.

4. The apparatus claimed in claim 3 in which said cushioning means includes a two piece element having a longitudinally slidable connection therebetween and a pressure surface on one of said sections exposed to pressure fluid from said conduit means for urging the casing in the direction toward the bottom of the hole.

5. The combination claimed in claim 4 in which said conduit means are formed in the casing and said sections and includes a portion leading to said cushioning means for the supply of pressure fluid thereto and a portion leading from said cushioning means to the drill casing for operating the piston.

References Cited in the file of this patent
UNITED STATES PATENTS

| | | |
|---|---|---|
| 884,151 | Hardsocg | Apr. 7, 1908 |
| 1,544,041 | Schirnhofer | June 30, 1925 |
| 1,660,033 | Braswell | Feb. 21, 1928 |
| 2,051,616 | Morrison | Aug. 18, 1936 |
| 2,584,978 | Bassinger | Feb. 12, 1952 |
| 2,620,165 | Crickmer | Dec. 2, 1952 |
| 2,634,101 | Sloan | Apr. 7, 1953 |